United States Patent [19]
Soenen et al.

[11] Patent Number: 5,832,377
[45] Date of Patent: Nov. 3, 1998

[54] COMBINED TRANSMITTER/RECEIVER INTEGRATED CIRCUIT WITH LEARN MODE

[75] Inventors: Eric G. Soenen, Plano; Gregory B. Davis, Allen; Thomas Adkins, Coppell; Russell K. MacDonald, Plano, all of Tex.

[73] Assignee: Texas Instruments, Incorporated, Dallas, Tex.

[21] Appl. No.: 503,965

[22] Filed: Oct. 26, 1995

Related U.S. Application Data

[63] Continuation of Ser. No. 259,819, Jun. 15, 1994, Pat. No. 5,471,668.

[51] Int. Cl.⁶ .................................................. H04B 9/00
[52] U.S. Cl. ................. 455/352; 455/151.2; 340/825.72; 340/539

[58] Field of Search .......................... 455/352, 73, 151.1, 455/151.2, 252.1, 333; 341/176; 340/825.72, 539; 342/198

[56] References Cited

U.S. PATENT DOCUMENTS

| | | | |
|---|---|---|---|
| 4,825,200 | 4/1989 | Evans et al. | 341/23 |
| 4,959,810 | 9/1990 | Darbee et al. | 455/352 |
| 5,255,313 | 10/1993 | Darbee | 379/102 |
| 5,278,547 | 1/1994 | Suman et al. | 340/825.32 |
| 5,471,668 | 11/1995 | Soenen et al. | 455/352 |

*Primary Examiner*—Viet Q. Nguyen
*Attorney, Agent, or Firm*—W. Daniel Swayze, Jr.; W. James Brady, III; Richard L. Donaldson

[57] ABSTRACT

An integrated circuit configurable as a transmitter/receiver includes learn capabilities that allows a receiver IC to memorize the identification pattern of a specific transmitter.

2 Claims, 6 Drawing Sheets

5,832,377

COMBINED TRANSMITTER/RECEIVER INTEGRATED CIRCUIT WITH LEARN MODE

This is a continuation of application Ser. No. 08/259,819 filed Jun. 15, 1994, now U.S. Pat. No. 5,471,668.

CROSS REFERENCE TO RELATED APPLICATIONS

This application is related to the following coassigned and simultaneously cofiled applications: TI-19359 bearing Ser. No. 08/260,148; TI-19363 bearing Ser. No. 08/259,803; and, TI-19365 bearing Ser. No. 08/259,820.

FIELD OF INVENTION

This invention is in the field of integrated circuits (IC's) and more particularly relates to transmitter IC's and receiver IC's.

BACKGROUND OF INVENTION

Remote control or remote access systems use a transmitter and a receiver. The transmitter generates an identification code which is a digital pattern that is modulated onto a radio frequency or infrared carrier. The receiver demodulates and decodes this pattern. If it matches a code it has stored in its own memory, access is granted.

Manufacturers of remote control systems usually build separate receiver and transmitter units. Since different integrated circuits form both types of units, the manufacturer has to keep inventory of both parts. Some semiconductor manufacturers, however, build an integrated circuit that may be used as a transmitter or as a receiver thus allowing the manufacturer of the system to keep an inventory of only one part. Texas Instruments Incorporated makes such a device called the "3637".

SMART devices are integrated circuits having programming thereon. They provide a wide amount of functionality for integrated circuits and are enabling integrated circuits to find applicability in many consumer products such as video recorders, television sets, microwave ovens, refrigerators etc. Such SMART devices require a fair amount of logic functionality to be included on an integrated circuit in addition to analog or interfacing (analog-to-digital or digital-to analog) functions.

It would be beneficial to incorporate SMART capabilities onto an integrated circuit useable as a transmitter and a receiver. Such capabilities would enhance the functionality of the device.

SUMMARY OF INVENTION

An integrated circuit incorporates a microcontroller and bi-directional pins for a combined receiver/transmitter IC for remote control applications that additionally has learn capabilities.

DESCRIPTION OF APPENDICIES

Figure 6:
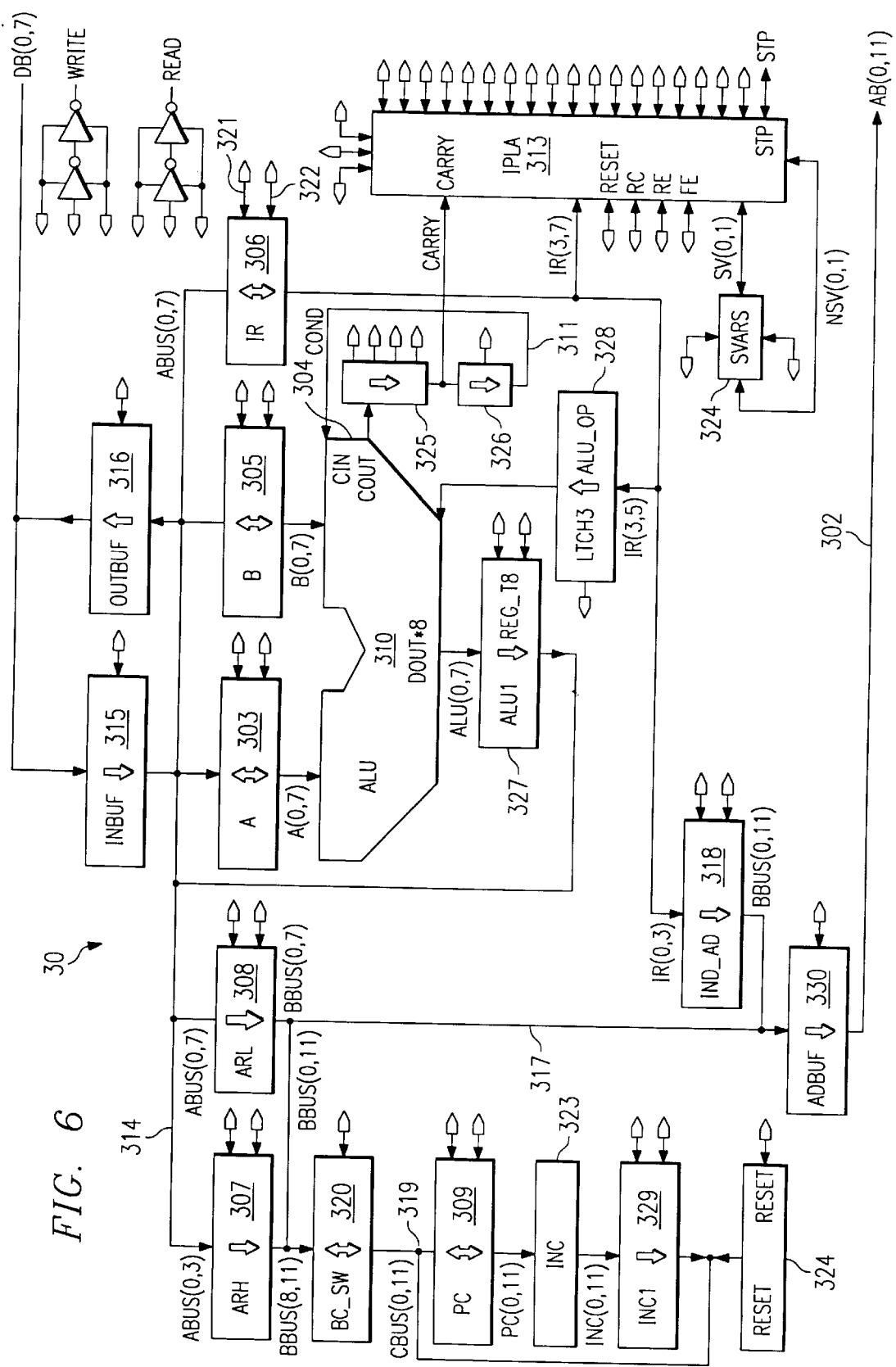
FIG. 6 is a block diagram an inventive processor core.

Appendix 1, pages 1–6, contains a listing of instructions for MPU 30 of FIG. 6.

Appendix 2, pages 1–3, contains an extended listing of the Instruction Programmable Logic Array 313 of MPU 30 of FIG. 6.

Appendix 3, page 1, contains a simplified listing of the Instruction Programmable Logic Array 313 of MPU 30 of FIG. 6.

DETAILED DESCRIPTION OF PREFERRED EMBODIMENT

Figure 1:
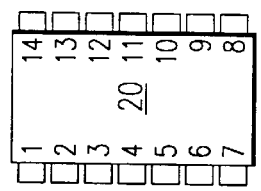
FIG. 1 is a pin layout of a semiconductor integrated circuit SMART device incorporating the invention.

FIG. 1 is a drawing illustrating a pin layout of an integrated circuit 20 incorporating the invention. As will be explained later in detail, integrated circuit 20 contains circuitry that advantageously allows it to perform as a transmitter and as a receiver. It additionally includes learn capability. Integrated circuit 20 has 14 pins and may be packaged in a dual in-line plastic and small outline surface-mount package. Table 1 provides a description of the pins. A discussion of selected pins thereafter follows.

TABLE 1

| PIN | N | I/O | DESCRIPTION |
| --- | --- | --- | --- |
| DIN/DOUT | 1 | I/O | Serial data input/output. In the receive mode, DIN/DOUT becomes an input to receive serial data from up to four transmitters. In the learn mode, DIN/DOUT becomes an input to learn code from up to four transmitters. In the transmit mode, DIN/DOUT becomes an output for the transmitted data. Clocked by the internal variable oscillator. |
| CONF | 2 | I | Device configuration bit. When set to is at a high logic level, the device assumes the transmitter mode (CONF is internally pulled up, and no connection to this terminal is required for the TX mode of operation). |

TABLE 1-continued

| PIN | N | I/O | DESCRIPTION |
|---|---|---|---|
| PROG | 3 | I | When set to a low logic level, the device assumes the receiver mode. When held to Vcc/2, the device enters a self-test mode. Programming enable. When set to a logic low state, the device operates as a transmitter or receiver. When PROG is momentary held to a logic-high state, the device enters the programming mode. PROG is internally pulled down and debounced. |
| LED | 4 | O | Transmit, receive, and program indication in the transmit mode, LED assumes a low state for the duration of the transmitted data time (15 frames). In the program mode, LED assumes a low state until the device has successfully received and stored 40-bits of code from DIN/DOUT. In the receiver mode, LED assumes a low state for a duration of 2500 data-clock cycles (0.5 s–5 s) when valid code is received on one or more of the four channels. LED is internally connected to a current source so that a LED indicator can be connected directly to this pin with no external current limiting resistor over the full range of operating voltage. |
| OSCC | 5 | I/O | Internal oscillator frequency control. A capacitor connected from OSCC to Vcc and a resistor connected from OSCR to OSCC determines the speed of the internal oscillator. The capacitor connected from OSCC to Vcc is optional. |
| OSCR | 6 | I/O | Internal oscillator frequency control. A resistor connected from OSCR to OSCC determines the speed of the internal oscillator (used in conjunction with an optional capacitor connected from OSCC to Vcc). |
| GND | 7 | | Analog and logic ground |
| VRC/TXI | 8 | I/O | Channel 1 VRC (valid received code) output and channel 1 TX enable. In the receive mode, VCR/TX1 is an output and toggles to a logic-low state when the device receives the correct 40-bits of security code and channel data (4 bits) matching channel 1. In the transmit mode, VRC/TX1 is an input used to enable transmission of channel-1. When VCR/TX1 is pulled to GND, the device tranmits the channel 1 code sequence stored in EEPROM memory from DIN/DOUT 15 times. The device will not transmit code again until VCR/TX1 is again pulled to GND. VRC/TX1 has an internal pull up resistor in both the transmitter and receiver modes and switch debouncing in the transmitter mode. |
| VRC/TX2 | 9 | I/O | Channel 2 VRC (valid received code) output and channel 2 TX enable. In the receive mode, VCR/TX2 is an output and toggles to a logic-low state when the device receives the collect 40-bits of security code and channel data (4 bits) matching channel 2. In the transmit mode, VRC/TX2 is an input used to enable transmission of channel-2. When VCR/TX2 is pulled to GND, the device transmits the channel 2 code sequence stored in EEPROM memory from DIN/DOUT 15 times. The device will not transmit code again until VCR/TX2 is again pulled to GND. VRC/TX2 has an internal pull up resistor in both the transmitter and receiver modes and switch debouncing in the transmitter mode. |
| VRC/TX3 | 10 | I/O | Channel 3 VRC (valid received code) output and channel 3 TX enable. In the receive mode, VCR/TX3 is an output and toggles to a logic-low state when the device receives the correct 40-bits of security code and channel data (4 bits) matching channel 3. In the transmit mode, VRC/TX3 is an input used to enable tranmission of channel-3. When VCR/TX3 is pulled to GND, the device transmits the channel 3 code sequence stored in EEPROM memory from DIN/OUT 15 times. The device will not transmit code again until VCR/TX3 is again pulled to GND. VRC/TX3 has an internal pull up resistor in both the transmission and receiver modes and switch debouncing in the transmitter mode. |
| VRC/TX4 | 11 | I/O | Channel 4 VRC (valid received code) output and channel 4 TX enable. In the receive mode, VCR/TX4 is an output and toggles to a logic-low state when the device receives the correct 40-bits of security code and channel data (4 bits) matching channel 4. In the transmit mode, VRC/TX4 is an input used to enable transmission of channel-4. When VCR/TX4 is pulled to GND, the device transmits the channel 4 code sequence stored in EEPROM memory from DIN/DOUT 15 times. The device will not transmit code again until VCR/TX4 is again pulled to GND. VRC/TX4 has an internal pull up resistor in both the transmitter and receiver modes and switch debouncing in the transmitter mode. |
| VCC | 12 | | +2.5 to 15 V (TRC1315 only) |
| N/C | 13 | | No internal connection in the device. |
| VCC/CAP | 14 | | +2.7 to +6 V (TRC1300 only) or 1 µF capacitor from CAP to ground (TRC1315 only) |

Integrated circuit (IC) 20 has 8 main functional pins, named LED, CONF, PROG, DIN/DOUT and VRC/TX (4 times). In the embodiment described herein, some are always inputs (CONF, PROG), some are always outputs (LED) and some are either, depending on the mode of operation (DIN/DOUT, VRC/TX). All 8 pins are advantageously implemented as bi-directional I/O ports, mapped in the memory space of a micro-controller (later described with reference to FIG. 2). This makes it possible to define any pin as either an input or an output, depending on software. Input/output (I/O) interface circuitry (later described with reference to FIG. 2) is implemented as two 8-bit registers: a direction register which is used to define the data direction on the pin, and a data register, which is used to write data to when a pin is defined as an output.

In FIG. 1, configuration (CONF) pin 2 is used as an input only. When a logic high is detected on this pin by the micro-controller, the device enters the transmit mode. In that mode, IC 20 reads 4 bits of parallel data from the VRC/TX pins, encodes them into serial digital format and outputs them onto the DIN/DOUT pin. When a logic low is detected on the CONF pin, IC 20 enters the receive mode. In that mode, IC 20 reads serial data on the DIN/DOUT pin, decodes it, and if the correct security code is present, outputs the information onto the 4 VRC/TX pins. When pin 2 is held at mid-supply for a certain time, a self-test mode for ROM, RAM and EEPROM is activated.

In FIG. 1, data input data output (DIN/DOUT) pin 1 is used for the serial digital data stream. When the system is in transmit mode, this pin is configured as an output. A serial pattern representing identification code and data is output onto this pin by the micro-controller 40 of FIG. 2. When the system is in receive mode, this pin is used as an input. A low-level, potentially noisy signal from the receive section of the system (external to IC 20) is read from this pin into the analog processor 22 of FIG. 2. After analog processing and digital filtering, the original serial data stream is reproduced. Identification code and data are then recovered through a decoding process.

In FIG. 1, valid received code/transmit (VRC/TX) pins 8–11 are used for parallel digital information such as is normally the state of push-button switches that will be connected to the pins when configured as a transmitter. When IC 20 is in transmit mode, these pins are configured as inputs. They are debounced and read by microcontroller 40 of FIG. 2. The 4 bits of parallel data are then transmitted serially, together with an identification code (later explained). When IC 20 is in receive mode, these pins are used as outputs. The 4 bits of information that are extracted from the serial data stream by a decoding process are written to these pins. As a result, the parallel data outputs on the receiver side will match the parallel data inputs on the transmitter side (provided a valid identification code as explained later exists).

In FIG. 1, program (PROG) pin 3 is used as an input only. When a logic high is detected on this pin by the micro-controller of FIG. 2, the device enters the learn (program) mode. In that mode, IC 20 waits for successful reception of data from a transmitter. After the data is decoded, the identification code is extracted and stored in non-volatile memory 36 shown in FIG. 2. From that point on, that transmitter (that identification code) becomes "authorized" on that receiver.

Figure 2:
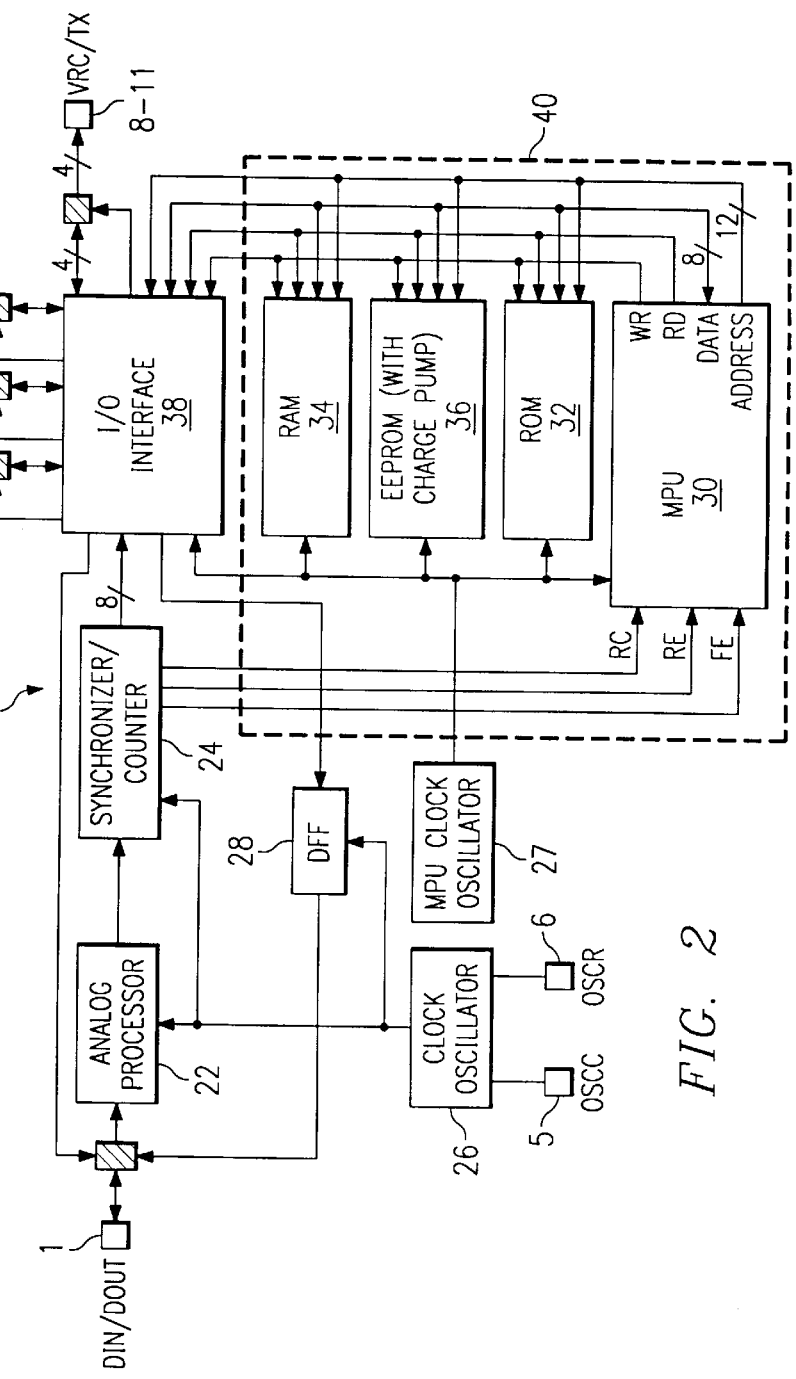
FIG. 2 is an architectural block diagram of the integrated circuit device of FIG. 1.

Still with reference to FIG. 1 and PROG pin 3, the learn mode causes a non-volatile flag in non-volatile memory 36 of FIG. 2 to be set, which causes IC 20 to "remember" that it has been in this mode. If afterwards, the transmit mode is activated, the flag causes stored identification codes to be deleted (randomized) from memory. This advantageous feature, called "transmitter-lock", improves security. It makes it impossible to "eavesdrop" and learn an identification code from an authorized user while in learn mode, with the intent of reproducing it afterwards and gain unauthorized access.

In FIG. 1, LED pin 4 is used as an output only. When a logic high is written to it by the micro-controller of FIG. 2, a regulated current is output. This current can drive an light emitting diode, LED, directly. As such LED pin 4 is used to indicate learn mode or successful completion of a self-test.

Turning now to FIG. 2, an architectural block diagram of IC 20 is illustrated. IC 20 includes an analog processor 22, a synchronizer/counter 24, a clock oscillator 26, a main processing unit (MPU) oscillator 27, a data flip-flop 28, a main processing unit (MPU) 30, a read only memory (ROM) 32, a random access memory (RAM) 34, a non-volatile electrically erasable programmable random access memory (EEPROM) 36, and input/output interface circuitry 38. A description of the circuit blocks of FIG. 2 follows.

In FIG. 2, analog processor block 22 processes the incoming serial data stream from DIN/DOUT pin 1. Its input consists of the raw, demodulated signal from an external radio-frequency (or infra-red) receive section. As such, it is only used in the receive mode. The input signal is normally weak (a few millivolts) and noisy. The DC level of the input signal is normally not very well defined. Analog processor 22 amplifies the AC (varying) portion of the signal and performs a limited amount of noise filtering on it. It eventually monitors the signal for transitions from a "low" state to a "high" state and generates a corresponding well-defined, digital output.

Figure 3:
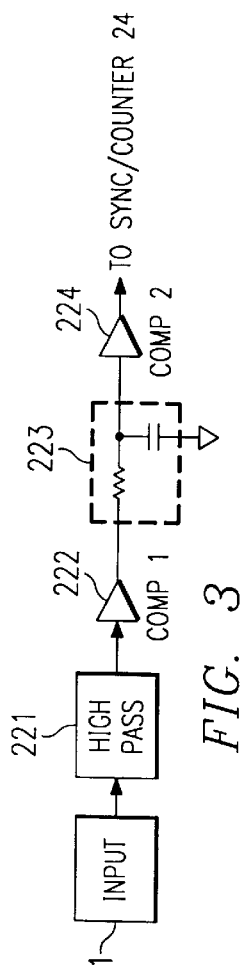
FIG. 3 is a schematic diagram of the analog processor 22 of FIG. 2.

FIG. 3 is a drawing illustrating analog processor block 22. Analog processor 22 includes a number of high-pass filters 221, a first comparator 222, a low-pass filter 223 and a second comparator 224 with hysteresis. High-pass filters 221 are used to reject the (fixed) DC level of the input signal, while amplifying the AC portion. A total AC gain of about 100 is enough to boost milli-volt range signals to a level practical for further processing. High-pass filters 221 are implemented by switched-capacitor technology. The clock rate of filters 221 is variable and set by clock oscillator 26, whose frequency is determined by an external capacitor and resistor. As a result, the filter cut-off frequency will automatically adjust to the (user-defined) sampling rate. For improved supply rejection performance (immunity to noise introduced by the digital portion of the IC), the high-pass filters are preferably implemented in fully-differential technology.

In FIG. 3, high-pass filters 221 are followed by a comparator 222, whose digital output is logic high when filter output 221 is negative and logic low when filter 221 output is positive. First comparator 221 is followed by a continuous-time low-pass filter 223 and a second comparator 224. Comparator 224 has a certain amount of input hysteresis to effectively reject short (high-frequency) digital noise spikes. The output of analog processor 22 is a clean digital data stream, which ideally should match the data stream generated by the transmitter IC.

Figure 4:
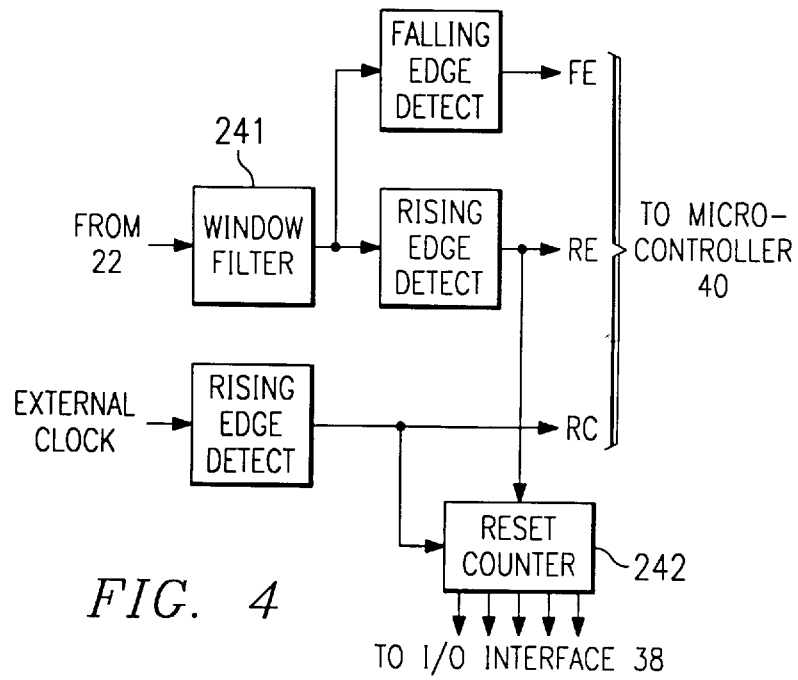
FIG. 4 is a schematic diagram of the synchronizer/counter 24 of FIG. 2.
Figure 5:
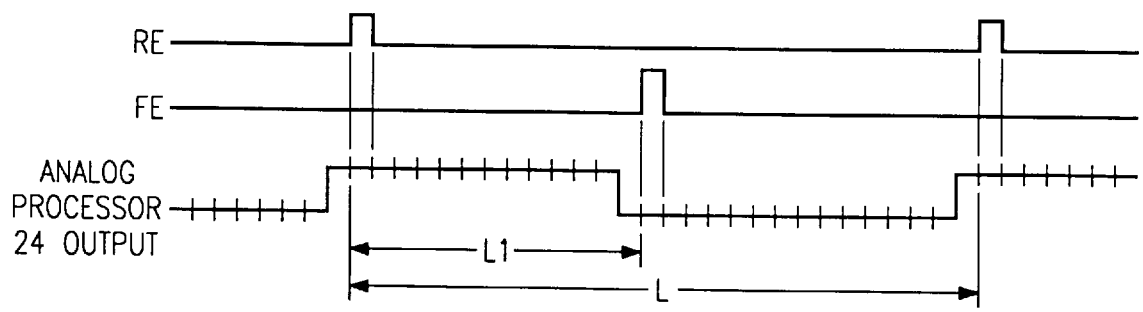
FIG. 5 is a timing diagram illustrating data sampling.

Continuing with FIG. 2, synchronizer/counter 24 samples the output from analog processor 22 (which output signal has digital levels but is still continuous-time) at the rate of the sample clock. It filters the resulting discrete-time signal and then determines (counts) the relative high and low times of that signal to allow for decoding by main processing unit 30. The filter used in this embodiment is a window filter 241 illustrated in FIG. 4 with a width of three and a simple majority voting scheme. This filter effectively eliminates any isolated (i.e. one sample long) noise spikes, should they have made it through analog processor 22. The counter portion of block 24 (unillustrated for clarity) interfaces to MPU 30 by the signals RE, FE and RC. It consists of an actual 8-bit counter which is incremented on each sampling clock cycle, and some logic to detect a rising or a falling edge of the incoming serial data stream. The counter is read by MPU 30 on each rising edge, and then reset. On each falling edge, the counter is read again (but not reset). This reading yields the "high" time of an incoming pulse, L1 as shown in FIG. 5.

The next reading (on the next rising edge) yields the total pulse width, L. The values of L1 and L are used by a decoding algorithm to extract the transmitted data from the serial stream as will be later explained with reference to FIG. 9. Reset counter 242 output feeds into I/O interface 38, which in turn is mapped in the memory address space. The signals that indicate rising or falling edges ("RE" and "FE" respectively) are connected directly into main processing unit 30.

In FIG. 2, clock oscillator 26 controls the rate of serial data transfer. In the transmit mode, it sets the bit rate of the transmitted serial data stream. In the receive mode, it sets the rate at which the incoming data stream is sampled. Oscillator 26 is of the relaxation type and uses one external resistor and one external transistor to set the frequency preferably between about 5 Khz and 50 Khz.

In FIG. 2, MPU oscillator 27 is fixed in frequency and controls the rate at which MPU 30 executes its program. Nominally, MPU 30 executes about 1 million instruction cycles per second. The output data (serial data stream) coming out of an IC 20 configured as a transmitter will be synchronized with the externally adjustable clock. MPU oscillator 27 produces the serial data at the required bit rate, based on the external clock. Information about the external clock is provided to the MPU 30 through the "RC" (rising clock edge) signal, which is generated by synchronization/ counter block 24. However, the serial data from MPU 30 must still be synchronized with clock oscillator 26. Data flip-flop 28, clocked off the clock oscillator 26 and placed between I/O interface 38 and the serial output pins 8–11 achieves the final synchronization.

MPU 30 of FIG. 2 is illustrated in block diagram form in FIG. 6. As the discussion below reveals, the MPU core architecture 30 is extremely simple, resulting in minimal hardware, yet it allows the implementation of very powerful logic or arithmetic functions. It is very compact, occupying only about 1000–1500 square mils of semiconductor die area, excluding memory. It may be manufactured by existing 1 micron double-metal CMOS technology such as the PRISM process practiced by Texas Instruments Incorporated.

In FIG. 6, MPU 30 has an 8-bit wide data bus 301 and a 12-bit wide address bus 302. This makes it possible to access up to 4096 8-bit wide memory locations (ROM 32, RAM 34, EEPROM 36 or 1/0 38) in a Von Neumann type architecture. Since MPU 30 is intended for small, embedded controller applications, such limited memory space is adequate. An advantage of a 12-bit wide address bus 302 is reduced hardware, compared to the more common case of a 16-bit wide address bus. All registers or logic blocks that operate on an address (program counter, incrementer, address register . . . ) are reduced in size.

The instruction set for MPU 30 of FIG. 6 is contained in Appendix 1 pages 1–6. The instruction set is very limited instruction set (22 instructions) and thus MPU 30 is of the reduced instruction set (RISC) type. The instructions perform the following functions:

Arithmetic and logic (7 instructions):
 add, subtract, logic AND, logic OR, exclusive OR, shift right with carry, shift left with carry.
 Mnemonics: ADD, SUB, AND, ORL, XOR, SHR, SHL
Register transfer (1 instruction):
 Load B register from accumulator.
 Mnemonic: LBA
Carry bit manipulation (2 instructions):
 set carry and clear carry.
 Mnemonics: STC, CLC
Jumps (3 instructions):
 Absolute jump, absolute jump when carry set, absolute jump when carry not set.
 Mnemonics: JMP, JPC, JNC
Memory access (5 instructions):
 load accumulator immediate, load accumulator direct, store accumulator direct, load accumulator indirect, store accumulator indirect.
 Mnemonics: LAV, LDA, STA, LAI, SAI The instructions provided above are sufficient to perform any kind of logic or arithmetic task anticipated task in the field of remote access.

In addition, 4 instructions allow house-keeping tasks to be performed in a simple manner: stop (and go to low-power stand-by mode), wait for rising data edge, wait for falling data edge, wait for rising clock edge. Mnemonics: STP, WRE, WFE, WRC.

STP halts execution of the program and puts MPU 30 in a low-power stand-by mode, from which it can be pulled again by an external logic signal. The STP instruction causes a flip-flop to be set, which freezes the MPU clock in a given state, until the flip-flop is reset by an external event (in this application, activation of a switch by a user).

WRE, WFE and WRC are instructions very specific to this embodiment. They place MPU 30 in a wait state until a specific event occurs (rising or falling edge in this case). These instructions are only used to synchronize MPU 30 during the decoding of a serial data stream, which is based on an externally supplied, unrelated clock.

While subroutine calls and returns are not supported in the preferred embodiment, they may be easily added.

The instruction set above together with the reduced 12 bit side address bus 302, allows a lot of flexibility in the choice of op-codes (binary values corresponding to each instruction). In this particular embodiment, the op-codes (8 bits long) were chosen so that the instructions requiring a memory reference (an address) could be distinguished from each other using only 4 bits. The 4 other bits are used as the high part of the address. The low part of the address is then coded in the next byte. This scheme utilizes the available ROM storage space more efficiently than if an opcode were followed by two bytes for memory reference. The approach taken results in smaller programs that also execute faster when given a fixed MPU clock rate.

Referring again to FIG. 6, MPU 40 has a very limited set of registers. All transfers to and from the memory are performed through the 8-bit accumulator or A register 303. All single-operand arithmetic or logic functions (e.g. SHL) are performed on A. A single condition or carry bit (C) 304 is used for indication of logic or arithmetic overflow, negative numbers (two's complement operations), shift output bits etc. The state of this one bit is used as a qualifier for conditional jumps. Two-operand logic or arithmetic operations (e.g. add, AND) are performed between A register 303 and a second 8-bit register, B 305. B register 305 can only be written to through the LBA command.

In FIG. 6, an 8-bit instruction register (IR) 306 is used to download instructions from memory and decode them. This register can only be written to/from memory, during an instruction fetch cycle. A 4 bit address register high (ARH) 307 is used to temporarily store the high part of a memory address. The associated address register low (ARL) 308 is used to temporarily store the lower 8 bits of an address. The program counter (PC) 309 is 12 bits wide and points to the next byte to be downloaded from the memory during program execution.

In FIG. 6, a slave register (SVARS) 324 holds 2 state variables which are used for composite instructions. An Instruction Program Logic Array (IPLA) 313, which is clocked in nature, acts as the master register. A master register CARRY 325 and a slave register C1 326 exist for condition (carry) bit 304. General reset, set and clear capability are provided. An arithmetic logic unit register ALU1 327 is a slave register for A register 303 and B register 305 (through ALU 310, which is combinational). This allows the result of an ALU operation to be returned to A register 303. In this "circular" mode, register ALU1 327 reads data on a clock cycle phi3, while A reads data on a clock cycle phi1.

Still with reference to FIG. 6, a register LATCH3 328 delays the three lines from instruction register 306 that select the ALU operation (IR(3,5)). This is because the pipelining of MPU 30 is such that while an instruction is down-loaded from memory, the ALU 310 operation of the previous instruction may still be going on. A register INC1 329 is a slave register for program counter PC 309 (through INC 323, which is combinational). This allows the result of a program counter increment to be returned into PC 309. An indirect addressing block IND_ADD 318 is a logic block (not a register) used to force an indirect address on address bus (BBUS) 317, when enabled. The input to block IND_AD 318 comes from instruction register 306 with four bits IR (0,3). These 4 bits (part of an instruction) select one out of 16 possible locations in the main memory, to be used as an indirect address location for the LAI and SAI instructions. Each one of those 16 locations consists of 2 bytes (since they need to hold a 12-bit actual address). A RESET block 324 is used to force CBUS 319 to 0 (initial execution address) during initialization when a RESET signal is enabled. RESET block 324 is implemented as a bank of N-channel MOS transistors.

In FIG. 6, the 8-bit ALU 310 allows for 7 different arithmetic operations, involving either only A register 303, or A register 303 and B register 305, as well as the condition bit 311. The select input 312 of ALU 310 consists of 3 lines, which come straight from Instruction Register 306 and determine which operation needs to be performed. The Instruction Program Logic Array (IPLA) 313 is used to decode the current instruction in IR 306. Its inputs also include two lines that represent state variables, for the execution of composite instructions, three external lines for synchronization of the program flow (RE, FE, RC) and a reset line. The outputs of IPLA 313 control the whole data flow between registers and building block of MPU 30. IPLA 313 is implemented as an AND-OR PLA with dynamic (pre-charged) outputs. Appendix 2, pages 1–3 contains an extended listing of IPLA 313 while appendix 3 page 1 contains a simplified listing.

Still referring to FIG. 6, in addition to 8-bit data bus 301 and 12-bit address bus 301, there are three separate, internal buses. The first bus, ABUS 314, is 8 bits wide and allows the exchange of data between data bus 301, and registers 303, 305, and 306. It also allows the output from ALU 310 to be fed back to register 303. Downloading of data from data bus 301 to address registers 307 and 308 happens through ABUS 314 as well. ABUS 314 is isolated from data bus 301 through two buffer blocks: INBUF 315 and OUTBUF 316. This allows internal registers to have a smaller drive strength than if they had been connected directly to data bus 301. The second bus, BBUS 317 is 12 bits wide and interfaces directly to external address bus 302. BBUS 317 allows for the exchange of data between the output of ARH 307 and ARL 308 (collectively also called address register or AR), and an indirect address register IND_AD 318. In some cases, BBUS 317 can be shorted to the third bus, CBUS 319. CBUS 319 is also 12 bits wide and is primarily used to carry the incremented value of program counter PC 309 back into PC 309. In some cases, it can be shorted to BBUS 317 (when the switch BC_SW 320 is closed).

In FIG. 6, A register 303 and B register 305 are single-port registers with a separate output. Both registers can read from ABUS 314 or write to ABUS 314, depending on whether enable in ENIN 321 or enable out ENOUT 322 is activated. The output is always enabled, irrespective of ENIN or ENOUT. Instruction register IR 306 is similar to registers 303 and 305, except that the ENOUT control input is permanently disabled (there is no need for IR 306 to write to ABUS 314). Address registers ARH 307 and ARL 308 are dual-port registers. When signal ENIN 321 is enabled, data is loaded into the appropriate register from ABUS 314. When signal ENOUT 322 is enabled, the appropriate output is written onto BBUS 317. When ENOUT 322 is inactive, the output in question is high-impedance.

Continuing a discussion of FIG. 6, BC_SW 320 is implemented as a simple, bidirectional CMOS switch, which is closed when the EN signal is high. PC 309 is a single-port register with separate output, of the same type as A register 303 and B register 305. Incrementer INC 323 is a simple combinational logic block (incrementer built with half-adders and a ripple carry).

In FIG. 6, ALU 310 is a simple combinational logic block. The add and subtract functions are performed with full adders and a carry ripple scheme. Multiplexers are used to select between the outputs of add/subtract or the other functions (AND OR . . . ). IPLA 313 is implemented as an AND-OR array with pre-charge on clock phase phi3 and evaluation on clock phase phi1. The outputs from the array (the actual PLA) are gated using separate logic gates with either clock signals phi1 or phi2 to generate the control signals that are to be active on those respective phases only. Signals that are to be active on clock phase phi3 are lathed on phi2 and then gated with phi3. INC 323 is a simple combinational logic block (icrementer built with half-adders and a ripple carry).

In FIG. 6, IND_AD 318 calculates an indirect address from instruction register 316 bits IR(0,3) by shifting the 4 bits one position to the left (this yields bits 1 through 4 of BBUS 317), pulling bits 5 through 10 of ABUS 314 low and bit 11 high. Bit 0 is held high when the first address location is accessed, low for the second one. The result is that the indirect address locations are mapped at memory addresses 800 through 81F (hex), which in this implementation is RAM 34.

In FIG. 6, ALU1 327, INC1 329, SVARS 324, CARRY 325 and C1 326 are implemented as standard (two-port) latches. INBUF 315, OUTBUF 316 and ADBUF 330, although simple buffers only intended to boost drive capability, are actually implemented as full static registers (latches). This is to avoid the possibility of floating nodes during the power-down condition. Discussion is now directed to the clocking scheme used for MPU 30 of FIG. 6. The clocking scheme relies on three non-overlapping clock phases: phi1, phi2 and phi3 produced by MPU clock 27. Phi1 is the evaluation phase for the (dynamic) IPLA 313. Also on phi1, addresses are updated and placed on the address bus 302. Phi2 is when all transfers to and from memory take place. The READ and WRITE signals are active during phi2. All inputs to IPLA 313 change state on phi2. Phi3 is the pre-charge phase of dynamic IPLA 313. Normally, no operations take place on phi3. One main exception is the case of an arithmetic or logic operation: the result is transferred from the ALU 310 output back to A register 303 during phi3. One advantage of the three-phase clocking scheme is that elementary instructions can be performed in one clock cycle (three phases). Also, the scheme is such that exactly one memory access occurs on each cycle. Since memory access is the slowest operation in this processor core, maximum speed advantage is gained. In addition, a three-phase scheme is ideally suited for access of most common memories (ROM 32, RAM 34 . . . ). During phi1, the memory address is presented. The whole phase allows the address buses and decoders within the memory to stabilize. Phi1 may also allow a pre-charge of memory bit lines. During phi2, the READ or WRITE signal is made active and the actual memory access occurs. Phase three ensures that address bus 302 remains stable while the READ or WRITE signal is removed. The scheme ensures that no glitching or spurious memory access can occur.

Returning now the discussion of FIG. 2, ROM 32 2 contains the executable program and the constant data used by MPU 30. The size of this program is about 1500 memory Bytes. RAM 34 of FIG. 2 holds temporary data generated during the execution of MPU 30's program. Examples are variables, counter values etc. RAM 34 contains about 32 memory bytes. EEPROM 36 of FIG. 2 holds non-volatile temporary data generated during execution of MPU 30's program. EEPROM 36 can be read directly by MPU 30. However, writing is a two-step operation. Volatile data (disappears when power is removed) is made permanent through the application of a high programming voltage (typically 16 V). This voltage is generated by an on-chip charge pump. EEPROM 36 contains about 24 EEPROM bytes and is primarily used to store 4 identification codes (5 bytes each), as well as various flags (e.g. for transmitter-lock).

MPU 30, ROM 32, RAM 34 and EEPROM 36 of FIG. 2 comprise a microcontroller 40 for IC 20 which advantageously provides the following functions:

Decoding of incoming serial data stream (receive and learn modes);

Comparison of incoming identification code with stored codes receive mode);

Activation of output pins (receive mode);

Polling and debouncing of parallel inputs (transmit mode);

Parallel to serial conversion (transmit mode);

Encoding of outgoing serial data stream (transmit mode);

Maintenance of EEPROM memory data;

Control and timing of charge pump for EEPROM memory;

Encryption and decryption, associated with a rolling code feature;

Various self-tests on ROM, RAM, EEPROM etc.; and

Various housekeeping tasks (activation and timing of LED . . . ).

Figure 7:
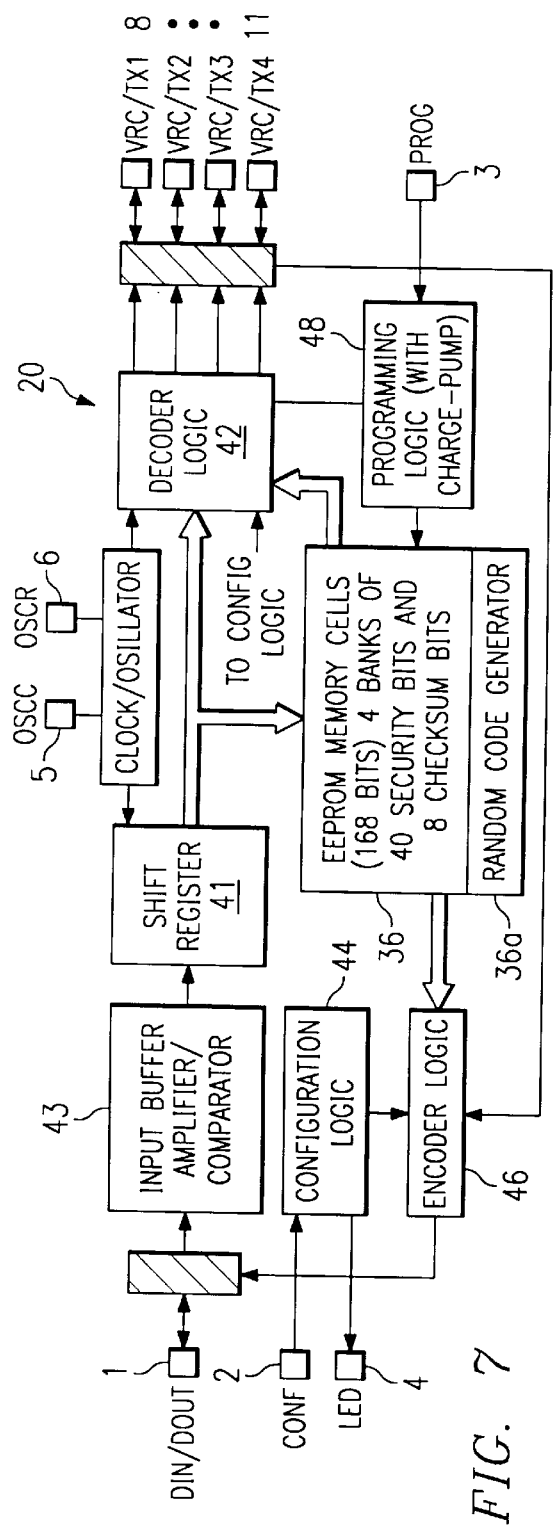
FIG. 7 is a functional block diagram of IC 20 of FIG. 2.

FIG. 7 illustrates a functional block diagram of IC 20. Functionally, a shift register 41 converts the incoming serial data bits to a parallel format. Decoder logic 42 is used in the receive mode to convert received symbols, later explained, to a 40 bit pattern that can be compared with four 40-bit codes stored in EEPROM 36. When a match is found with the stored code, the appropriate output pin (VRC/TX1–4) will be active for the entire time valid code is received. Configuration logic 44 configure IC 20 as either a transmitter or receiver. Both the encoder logic 46 and the decoder logic 42 as well as the bidirectional I/O ports are controlled by configuration logic 44. Encoder logic 46 uses parallel data from EEPROM 36 and encodes the selected security code for transmission to DIN/DOUT pin 1. The pre-code and security code symbol sequences are generated in encoder 46, as well as the channel identifier code. Transmission is enabled by a logic transition (to a low state) on one or more of the four input pins VRC/TX8–11. EEPROM 36 stores the four banks of 40 bit security codes (40 bits for each learned transmitter). EEPROM 36 functionally also contains random code generation logic 36a, which can be used to generate random code for IC 20 configured as a transmitter. Programming logic 48 generates the programming pulse (using an internal charge-pump) required to program EEPROM 36 after the code has been loaded into the memory cells (via a parallel bus) from the shift resister 41. Timing for the specific programming pulse ramping voltage is derived from an internal fixed clock.

Figure 8:
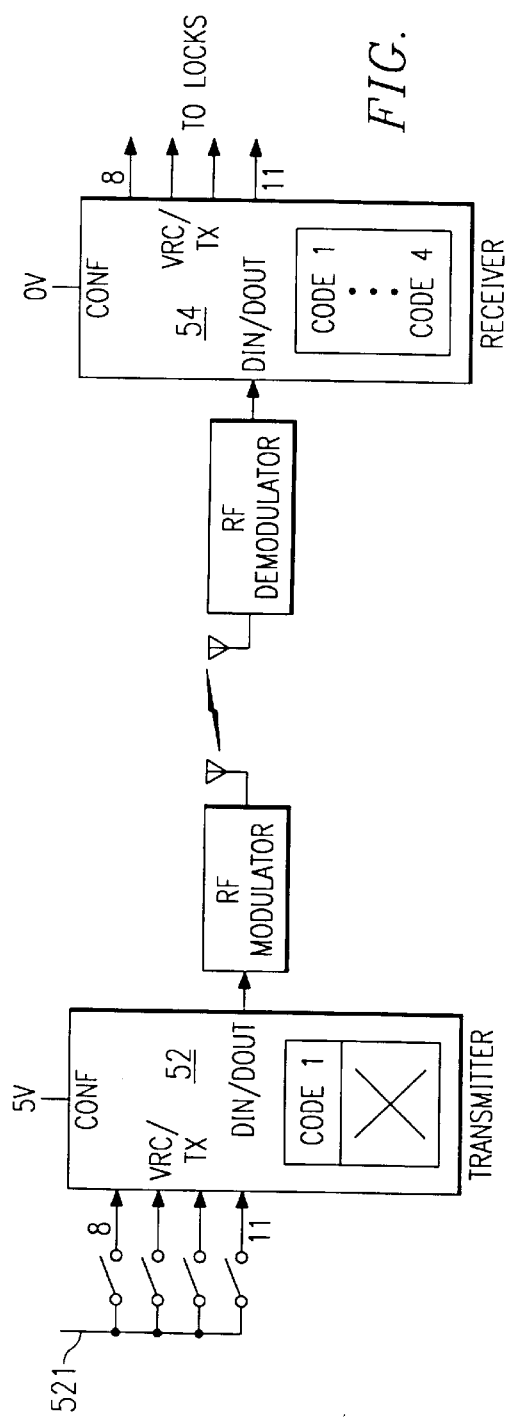
FIG. 8 is a diagram illustrating an IC 20 configured as a transmitter and another IC 20 configured as a receiver in a data transmission system.

FIG. 8 illustrates a data system 50 employing IC 20. IC 20 is configured as a transmitter 52 by connecting CONF pin 2 to Vcc while IC 20 is configured as a receiver 54 by connecting CONF pin 2 to ground. Data system 50 is exemplary of a garage door opening system. Transmitter 52 will be housed in a remote control situated in an automobile, for example, while receiver 54 will be connected to the garage door opener. Data system 50 is also exemplary of an automobile security system wherein transmitter 50 may be housed in a key and receiver 50 may be connected to automobile door locks. Switches 521 will connect to VRC/TX pins 8–11 of transmitter 52 and activate transmitter 52 when pressed while VRC/TX pins of receiver 54 will be connected to door locks, for example. Communication between transmitter 52 and receiver 54 is accomplished by connecting DIN/DOUT pins 1 to a radio frequency modulator and to a radio frequency demodulator.

In FIG. 8, pins 8–11 of transmitter 52 are inputs. Transmitter 52 reads those inputs and anchors the data into a serial format and brings it out to pin 1 where it is transmitted to receiver 54. Since CONF pin 2 of receiver 54 is grounded, receiver 54 is configured to receive the serial transmitted data The serial transmitted data from transmitter 52 is input into receiver 54 through DIN/DOUT pin 1 of receiver 54. VRC/TX pins 8–11 of receiver 54 function as output pins. Hence, the same pins of IC 20 may be used as a transmitter or as a receiver by reversing the direction according to the configuration.

Figure 12:
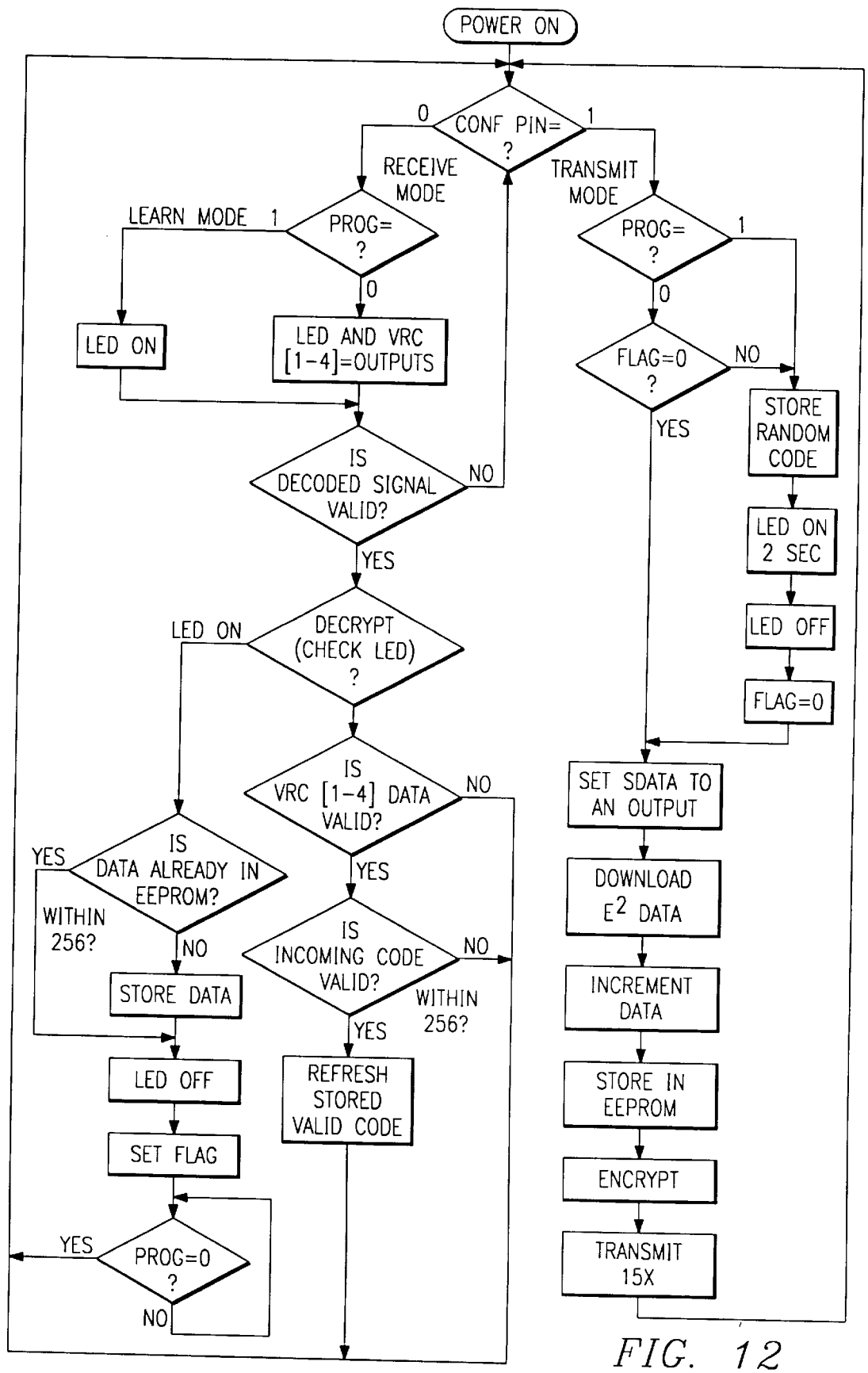
FIG. 12 is a flow chart illustrating a transmitter lock method.

Referring back to the functional diagram of FIG. 7, configuration logic 44 configure IC 20 as a receiver or a transmitter. In actuality, microcontroller 40 of FIG. 2 performs the configuration as illustrated in FIG. 12. Upon power up, a program embedded in ROM 32 causes microcontroller 40 to sense CONF pin 2. If a logic high is sensed, microcontroller 40 causes IC 20 to configure itself as a transmitter. If a logic low is sensed, microcontroller 40 causes IC 20 to configure itself as a receiver.

In FIG. 8, transmitter 52 has a unique identification code which is encoded into a serial digital data format when transmitter is activated. The digital signal is modulated onto a channel (usually radio frequency or infra-red). Receiver 54 demodulates the signal and decodes the serial digital information. The identification code is compared to the code(s) stored in receiver 54. If a match is found, access is granted. In IC 20, a code consists of 40 bits, which means that it can have one out of 2^40 (1 trillion) possible values. A transmitter normally uses only one code, illustrated as code 1 in transmitter 52. A receiver has the option of learning several (4). This allows several separate transmitters to activate the same receiver.

Figure 9:
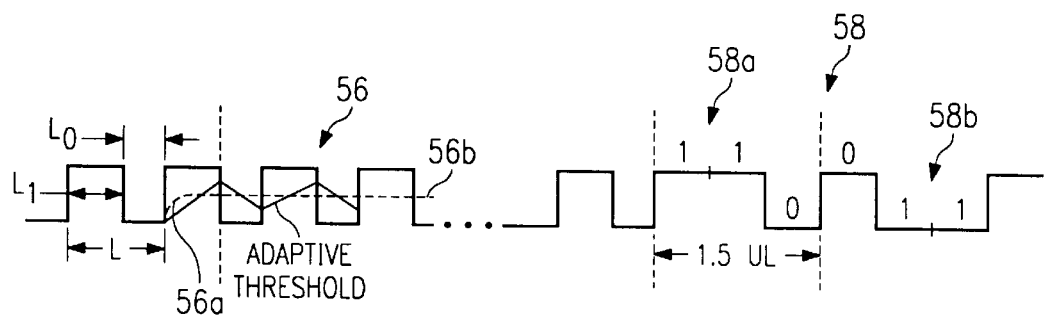
FIG. 9 is a timing diagram illustrating the transmission of a data stream by the transmitter of FIG. 8.
Figure 10:
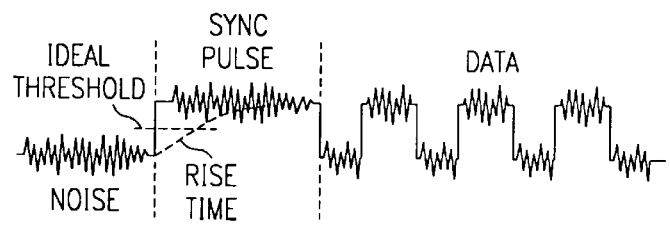
FIG. 10 is a prior art drawing illustrating transmission of a data stream.

Referring now to FIG. 9, the data format used by IC 20 is illustrated. The serial data transmitted by transmitter 52 of FIG. 8 consists of a synchronization sequence 56 (used by receiver 54 to recover timing information), followed by forty security bits and eight bits that represents the parallel data (four bits, transmitted twice in a row) which collectively are represented by reference numeral 58. In contrast with prior art techniques which use a long sync pulse as shown in FIG. 10, synchronization sequence 56 consists of twenty four data pulses with nominally 50% duty cycle (one time unit high and one time unit low, or 1010101010 . . . 10, for equal amounts of time). The forty eight bits carrying information are encoded as a 110 (logic "1") or 100 (logic "0"). Three data pulses are encoded into symbols for logic "1" and logic "0". Reference numeral 58*a* represents the encoded logic "1" and reference numeral 58*b* represents the encoded logic "0".

In FIG. 9, the data format generated by transmitter 52 is received by self adaptive amplifier/comparator filter 43 (FIG. 7) of receiver 54. Some noise usually precedes sync sequence 56. Amplifier/comparator 43 searches and synchronizes the data stream to extract the data back. Since sync sequence 56 is comprised of a number of data pulses, as opposed to one long pulse, the time constant 56*a* of filter 43 rises very quickly and goes to the average value of the incoming signal much faster than prior art techniques thus providing much more reliable detection. Since three time units are encoded data, the actual duty cycle is not 50% anymore, but rather 33% or 66%. The data signal thus has more AC components and less DC noise components which aids filter 43 to rise quickly and keep its adaptive threshold switching value 56*b* in about the middle of the signal.

Still referring to FIG. 9, receiver 54 must determine when sync pulse 56 is finished and when data sequence 58 begins. Microcontroller 40 accomplishes this by comparing the pulses. An algorithm within microcontroller 40 looks for each pulse. The sync pulse roughly should have a 50% duty cycle and the actual criterion used by microcontroller 40 is that sync pulse 56 would be between the range of $\frac{3}{8}$ and $\frac{5}{8}$. L represents one high/low transition pulse of sync pulse 56 comprised of high signal L1 and low signal L0. Microcontroller recognizes a valid sync pulse when $\frac{3}{8}$ L<L1<$\frac{5}{8}$ L.

Still referring to FIG. 9, the symbol detection is slightly different. If microcontroller 40 detects eight consecutive pulses that have the same 50% duty cycle, then that length is considered as a unit length UL and everything else is referred to it. This means that a symbol 58*a* or 58*b* is 1.5 UL. Microcontroller 40 recognizes a valid symbol when 1$\frac{1}{8}$ UL<L<1$\frac{3}{8}$ UL. So, the algorithm first looks for eight valid sync pulses, that is, at least eight pulses that have 50% duty cycle. After this, microcontroller 40 then looks to determine symbols by the formula 1$\frac{1}{8}$ UL<L<1$\frac{3}{8}$ UL. Now a determination between the symbol logic "1" 58*a* and the symbol logic "0" 58*b* must be made. This is done by comparing the length of the symbols. The algorithm determines a logic "1" if L1 is longer than a L0. If L0 is longer than L1, a logic "0" exists. This can be further refined with additional constraints such that L1 needs to be between $\frac{3}{8}$ and $\frac{5}{8}$ and L0 needs to between $\frac{7}{8}$ and $\frac{9}{8}$. Of course, the algorithm can be set to reverse the logical "0" and the logical "1" determination. So, every comparison is made on a ratio metric basis compared to total unit length UL to distinguish between sync and data. One of the advantages of using ratios 3/8 and 5/8 is that division by eight is very easy in binary. This allows the determination to be made real time efficiently at a very high rate. Since symbols have a different length (3 bits) than sync pulse (2 bits) they can be easily distinguished by the decoding algorithm The difference between a logic 0 or a logic 1 can be determined by checking whether the duty cycle is more or less than 50%. The fact all pulses are close to symmetrical guarantees a frequency contents that helps the adaptive filter 43 threshold detector.

As mentioned above with reference to FIG. 8, transmitter 52 has one identification code stored in EEPROM 36 and receiver 54 may recognize 4 codes at any one time. EEPROM 36 contains four banks of forty bits that are used for security code and an additional eight bits used for check sum (error correcting). The total EEPROM memory is 168 bits plus a few extra bits bringing the total to 192 bits. When configured as a receiver, these banks store up to four learned codes; when configured as a transmitter, only the first bank of forty bits is used as a security code. Channel differentiation which is described by position of an additional four symbols actually sent twice in a row (to avoid corruption of data) sent to identify the channel(s) that have been activated. More than one channel can be activated at the same time. At the receiver, after the first forty bits are found to match one of the four forty bit codes stored in EEPROM 36, the last four symbols are decoded and used to enable the appropriate channel(s). If desired, a four bit binary decoder could be used at the receive to control up to 16 devices, one at a time, based on the four channel output.

Figure 11:
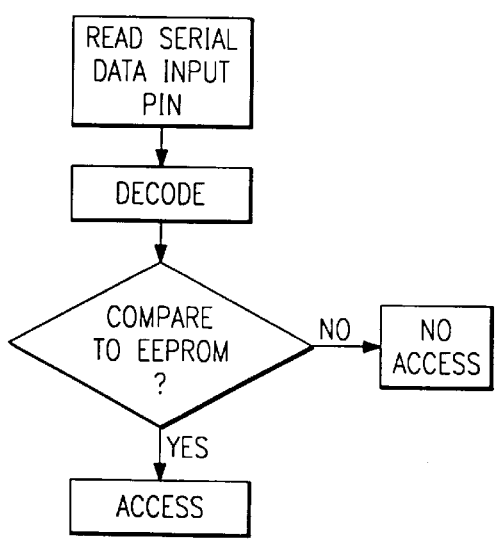
FIG. 11 is a flowchart illustrating receiver access grant.

Referring now to FIG. 11, when transmitter 52 sends out the serial data stream, receiver 54 receives the stream, decodes the stream and stores the forty bit identification code into RAM 34. MPU 30 compares the received forty bit identification code against the codes stored in EEPROM 36. If a match occurs, access is granted and the data bits are sent to output pin 1. If no match occurs, nothing is done. IC 20 advantageously has capability to learn the transmitted code of receiver 54 as is next explained.

The learn mode is accessed by placing a logic high on PROG pin 3. Microcontroller 40 then monitors DIN pin 1. When a valid serial input stream is received, it is decoded as explained above. The extracted identification code is then added to the list of authorized codes in EEPROM 36 of the receiver. The receiver can learn up to four transmitter codes. If programming is attempted for the fifth time, the receiver overwrites the first stored code.

Having an integrated circuit that can be used a transmitter, as a receiver, and has learn capability is a offers a powerful advantage. An additional function called transmitter lock ensures that any time after the learn mode is entered on IC 20, the transmit mode for that IC 20 cannot be activated without first erasing any memorized identification codes. This advantageously prevents a dishonest user from putting a receiver chip in learn mode, eavesdropping on someone else's data transmission and thereby learning their code, taking his chip out and sticking it into a transmitter board to obtain a "duplicate" unauthorized transmitter.

FIG. 12 is a device flow chart for IC 20 showing the transmitter lock feature. Whenever IC 20 is taken into the learn mode, a flag is set and permanently programmed into EEPROM 36. Upon power on reset, microcontroller 40 checks CONF pin to determine if IC 20 is to function as a transmitter or as a receiver. If it is to function as a transmitter, microcontroller 40 checks the flag status stored in EEPROM 36. If the flag is not set, then this indicates IC 20 has not previously been configured in learn mode and normal transmission occurs. If the flag has been set, the memorized identification codes are randomized (which has an effect similar to erasing).

With respect to FIGS. 12 and 8, to further avoid an unauthorized user learning transmitter 52's identification code, the code is changed (rolled) by microcontroller 40 according to a fixed sequence algorithm, known only to transmitter 52 and receiver 54 but unknown to any potential eavesdropper.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

*APPENDIX 1.*

INSTRUCTION SET
------------------------

ALL STATES:

(1) eval IPLA
    (2) nsv -> sv
        ALU -> ALU1
    (3) prech IPLA
        INC -> INC1
        C -> C1

RESET CONDITION:

0   (1) 0 -> CBUS -> PC
       CBUS -> BBUS
   (2) read
       DB -> ABUS -> IR
       ABUS -> ARH
       0 -> C STP:
Stop and shut down clocks until POR or wake-up    ← *Description*
0000 0XXX    ← *OP code*
1 Byte, 1 Cycle    ← *Length*
C: No change    ← *Influence on carry*

0   (1) INC1 -> CBUS -> PC
       CBUS -> BBUS
   (2) read
       DB -> ABUS -> IR
       ABUS -> ARH SHL:
Logic Shift Left on Accumulator
0000 1XXX
1 Byte, 1 Cycle
C -> bit 0, bit 7 -> C 0   (1) INC1 -> CBUS -> PC
       CBUS -> BBUS
   (2) read
       DB -> ABUS -> IR
       ABUS -> ARH
       COUT -> C
   (3) ALU1 -> ABUS -> A SHR:
Logic Shift Right on Accumulator
0001 0XXX
1 Byte, 1 Cycle
C -> bit 7, bit 0 -> C

*TI-19360 p1*

AND:
Logic AND B Register to Accumulator
0001 1XXX
1 Byte, 1 Cycle
If result = 00, C = 0, else C = 1

ORL:
Logic OR B Register to Accumulator
0010 0XXX
1 Byte, 1 Cycle
If result = 00, C = 0, else C = 1

XOR:
Logic EXOR B Register to Accumulator
0010 1XXX
1 Byte, 1 Cycle
If result = 00, C = 0, else C = 1

ADD:
Add B Register to Accumulator
0011 0XXX
1 Byte, 1 Cycle
C -> Carry In, Carry Out -> C SUB:
Subtract B Register from Accumulator
0011 1XXX
1 Byte, 1 Cycle
C -> Borrow In, Borrow Out -> C CLC:
Clear Condition Register
0100 0XXX
1 Byte, 1 Cycle
0 -> C 0   (1) INC1 -> CBUS -> PC
        CBUS -> BBUS
    (2) read
        DB -> ABUS -> IR
        ABUS -> ARH
        0 -> C STC:
Set Condition Register
0100 1XXX
1 Byte, 1 Cycle
1 -> C WRE:
Wait for Rising Edge  (0->1 Transition) on Data Input
0101 0XXX
1 Byte, 1 Cycle Minimum
C: No change 0   (1) if RE
            INC1 -> CBUS -> PC
            CBUS -> BBUS
        else
            PC -> CBUS -> BBUS
    (2) read
            DB -> ABUS -> IR
            ABUS -> ARH WFE:
Wait for Falling Edge (1->0 Transition) on Data Input
0101 1XXX
1 Byte, 1 Cycle Minimum
C: No change WRC:
Wait for Rising Clock Edge (0->1 Transition)
0110 0XXX
1 Byte, 1 Cycle Minimum
C: No change LAV value:
Load Accumulator with Value, Immediate
0110 1XXX
2 Bytes, 2 Cycles
C: No change 0   (1) INC1 -> CBUS -> PC
        CBUS -> BBUS
    (2) read
        DB -> ABUS -> A 1   (1) INC1 -> CBUS -> PC
        CBUS -> BBUS
    (2) read
        DB -> ABUS -> IR
        ABUS -> ARH

```
LBA:
Load B Register from Accumulator
0111 0XXX
1 Byte, 1 Cycle
C: No change 0    (1) INC1 -> CBUS -> PC
         CBUS -> BBUS
     (2) read
         DB -> ABUS -> IR
         ABUS -> ARH
     (3) A -> ABUS -> B LDA address:
Load Accumulator from Memory, Direct
1000 AAAA
2 Bytes, 3 Cycles
C: No change 0    (1) INC1 -> CBUS -> PC
         CBUS -> BBUS
     (2) read
         DB -> ABUS -> ARL 1    (1) AR -> BBUS
     (2) read
         DB -> ABUS -> A 2    (1) INC1 -> CBUS -> PC
         CBUS -> BBUS
     (2) read
         DB -> ABUS -> IR
         ABUS -> ARH STA address:
Store Accumulator to Memory, Direct
1001 AAAA
2 Bytes, 3 Cycles
C: No change 0    (1) INC1 -> CBUS -> PC
         CBUS -> BBUS
     (2) read
         DB -> ABUS -> ARL 1    (1) AR -> BBUS
     (2) write
         A -> ABUS -> DB 2    (1) INC1 -> CBUS -> PC
         CBUS -> BBUS
     (2) read
         DB -> ABUS -> IR
         ABUS -> ARH
```

TI-19360 P4

```
JMP address:
Jump to Absolute Address
1010 AAAA
2 Bytes, 2 Cycles
C: No change 0   (1) INC1 -> CBUS -> PC
        CBUS -> BBUS
    (2) read
        DB -> ABUS -> ARL 1   (1) AR -> BBUS
        BBUS -> CBUS -> PC
    (2) read
        DB -> ABUS -> IR
        ABUS -> ARH JPC:
Jump to Absolute Address when Condition Set
1011 AAAA
2 Bytes, 2 Cycles
C: No change 0   (1) INC1 -> CBUS -> PC
        CBUS -> BBUS
    (2) read
        DB -> ABUS -> ARL 1   (1) if C
          AR -> BBUS
          BBUS -> CBUS -> PC
        else
          INC1 -> CBUS -> PC
          CBUS -> BBUS
    (2) read
        DB -> ABUS -> IR
        ABUS -> ARH JNC:
Jump to Absolute Address when NOT Condition
1100 AAAA
2 Bytes, 2 Cycles
C: No change LAI address:
Load Accumulator from Memory, Indirect
1101 AAAA
1 Byte, 4 Cycles
C: No change 0   (1) a1 -> BBUS    (a1 = 800 hex + 2 * [lower 4 bits of IR])
    (2) read
```

```
        DB -> ABUS -> ARH 1   (1) a2 -> BBUS      (a2 = 800 hex + 2 * [lower 4 bits of IR] + 1)
    (2) read
        DB -> ABUS -> ARL 2   (1) AR -> BBUS
    (2) read
        DB -> ABUS -> A 3   (1) INC1 -> CBUS -> PC
        CBUS -> BBUS
    (2) read
        DB -> ABUS -> IR
        ABUS -> ARH
```

SAI address:
Store Accumulator to Memory, Indirect
1110 AAAA
1 Byte, 4 Cycles
C: No change

```
0   (1) a1 -> BBUS      (a1 = 800 hex + 2 * [lower 4 bits of IR])
    (2) read
        DB -> ABUS -> ARH 1   (1) a2 -> BBUS      (a2 = 800 hex + 2 * [lower 4 bits of IR] + 1)
    (2) read
        DB -> ABUS -> ARL 2   (1) AR -> BBUS
    (2) write
        A -> ABUS -> DB 3   (1) INC1 -> CBUS -> PC
        CBUS -> BBUS
    (2) read
        DB -> ABUS -> IR
        ABUS -> ARH
```

APPENDIX 2
INSTRUCTION PLA (ext...)
OUTPUT CONTROL SIGNAL

INPUTS | OUTPUT CONTROL SIGNAL | STATIC VARIABLES

```
                                A A            I           A
                                B B A S C P N D A         A L       I
                                U U R H B C C B B A A A B U       I A
      I    S P  C         R     S S 2 O U 2 2 2 U B 2 B U 2         A 2
      N    T H  A         E     2 2 B R S C C A S U A U S A C S B B       N N
      S    A A  R         S     A A B T 2 B B B 2 S B S 2 B L E I B S     S S
      T    T S  R R R F E       R R U B P U U U D 2 U 2 I U R T T U T     V V
      R    E E  Y C E E T       H L S C C S S S B A S B R S C C 0 S P     0 1

RST   X 1  X X X X 1            0 0 0 1 1 0 0 0 0 0 0 0 0 0 0 0 0 0 0     0 0
        2                       1 0 0 0 0 0 0 1 0 0 0 0 1 0 1 0 0 0 0     0 0

STP   0 1  X X X X 0            0 0 0 1 1 0 1 0 0 0 0 0 0 0 0 0 0 0 0     0 0
        2                       1 0 0 0 0 0 0 1 0 0 0 0 1 0 1 0 0 0 1     0 0

SHL   0 1  X X X X 0            0 0 0 1 1 0 1 0 0 0 0 0 0 0 0 0 0 0 0     0 0
etc.    2                       1 0 0 0 0 0 0 1 0 0 0 0 1 0 1 1 0 0 0     0 0
        3                       0 0 0 0 0 0 0 0 0 0 0 0 0 1 0 0 0 0 0     0 0

CLC   0 1  X X X X 0            0 0 0 1 1 0 1 0 0 0 0 0 0 0 0 0 0 0 0     0 0
        2                       1 0 0 0 0 0 0 1 0 0 0 0 1 0 1 0 0 0 0     0 0

STC   0 1  X X X X 0            0 0 0 1 1 0 1 0 0 0 0 0 0 0 0 0 0 0 0     0 0
        2                       1 0 0 0 0 0 0 1 0 0 0 0 1 0 0 1 0 0 0     0 0

WRE   0 1  X X 1 X 0            0 0 0 1 1 0 1 0 0 0 0 0 0 0 0 0 0 0 0     0 0
      0 1  X X 0 X 0            0 0 0 1 0 1 0 0 0 0 0 0 0 0 0 0 0 0 0     0 0
        2                       1 0 0 0 0 0 0 1 0 0 0 0 1 0 0 0 0 0 0     0 0

WFE   0 1  X X X 1 0            0 0 0 1 1 0 1 0 0 0 0 0 0 0 0 0 0 0 0     0 0
      0 1  X X X 0 0            0 0 0 1 0 1 0 0 0 0 0 0 0 0 0 0 0 0 0     0 0
        2                       1 0 0 0 0 0 0 1 0 0 0 0 1 0 0 0 0 0 0     0 0

WRC   0 1  X 1 X X 0            0 0 0 1 1 0 1 0 0 0 0 0 0 0 0 0 0 0 0     0 0
      0 1  X 0 X X 0            0 0 0 1 0 1 0 0 0 0 0 0 0 0 0 0 0 0 0     0 0
        2                       1 0 0 0 0 0 0 1 0 0 0 0 1 0 0 0 0 0 0     0 0

LAV   0 1  X X X X 0            0 0 0 1 1 0 1 0 0 0 0 0 0 0 0 0 0 0 0     0 0
        2                       0 0 0 0 0 0 0 1 0 1 0 0 0 0 0 0 0 0 0     0 0

1 1  X X X X 0            0 0 0 1 1 0 1 0 0 0 0 0 0 0 0 0 0 0 0     0 0
        2                       1 0 0 0 0 0 0 1 0 0 0 0 1 0 0 0 0 0 0     0 0

LBA   0 1  X X X X 0            0 0 0 1 1 0 1 0 0 0 0 0 0 0 0 0 0 0 0     0 0
```

TI-19360 P1

```
          2            1 0 0 0 0 0 0 1 0 0 0 0 1 0 0 0 0 0 0   0 0
          3            0 0 0 0 0 0 0 0 0 0 0 1 0 0 0 0 0 0 0   0 0

LDA   0 1  X X X X 0   0 0 0 1 1 0 1 0 0 0 0 0 0 0 0 0 0 0 0   0 0
          2            0 1 0 0 0 0 0 1 0 0 0 0 0 0 0 0 0 0 0   0 1

1 1  X X X X 0   0 0 1 0 0 0 0 0 0 0 0 0 0 0 0 0 0 0 0   1 0
          2            0 0 0 0 0 0 0 1 0 1 0 0 0 0 0 0 0 0 0   0 0

2 1  X X X X 0   0 0 0 1 1 0 1 0 0 0 0 0 0 0 0 0 0 0 0   0 0
          2            1 0 0 0 0 0 0 1 0 0 0 0 1 0 0 0 0 0 0   0 0

STA   0 1  X X X X 0   0 0 0 1 1 0 1 0 0 0 0 0 0 0 0 0 0 0 0   0 1
          2            0 1 0 0 0 0 0 1 0 0 0 0 0 0 0 0 0 0 0   0 0

1 1  X X X X 0   0 0 1 0 0 0 0 0 0 0 0 0 0 0 0 0 0 0 0   1 0
          2            0 0 0 0 0 0 0 0 1 0 1 0 0 0 0 0 0 0 0   0 0

2 1  X X X X 0   0 0 0 1 1 0 1 0 0 0 0 0 0 0 0 0 0 0 0   0 0
          2            1 0 0 0 0 0 0 1 0 0 0 0 1 0 0 0 0 0 0   0 0

JMP   0 1  X X X X 0   0 0 0 1 1 0 1 0 0 0 0 0 0 0 0 0 0 0 0   0 1
          2            0 1 0 0 0 0 0 1 0 0 0 0 0 0 0 0 0 0 0   0 0

1 1  X X X X 0   0 0 1 1 1 0 0 0 0 0 0 0 0 0 0 0 0 0 0   0 0
          2            1 0 0 0 0 0 0 1 0 0 0 0 1 0 0 0 0 0 0   0 0

JPC   0 1  X X X X 0   0 0 0 1 1 0 1 0 0 0 0 0 0 0 0 0 0 0 0   0 1
          2            0 1 0 0 0 0 0 1 0 0 0 0 0 0 0 0 0 0 0   0 0

1 1  1 X X X 0   0 0 1 1 1 0 0 0 0 0 0 0 0 0 0 0 0 0 0   0 0
      1 1  0 X X X 0   0 0 0 1 1 0 1 0 0 0 0 0 0 0 0 0 0 0 0   0 0
          2            1 0 0 0 0 0 0 1 0 0 0 0 1 0 0 0 0 0 0   0 0

JNC   0 1  X X X X 0   0 0 0 1 1 0 1 0 0 0 0 0 0 0 0 0 0 0 0   0 1
          2            0 1 0 0 0 0 0 1 0 0 0 0 0 0 0 0 0 0 0   0 0

1 1  0 X X X 0   0 0 1 1 1 0 0 0 0 0 0 0 0 0 0 0 0 0 0   0 0
      1 1  1 X X X 0   0 0 0 1 1 0 1 0 0 0 0 0 0 0 0 0 0 0 0   0 0
          2            1 0 0 0 0 0 0 1 0 0 0 0 1 0 0 0 0 0 0   0 0

LAI   0 1  X X X X 0   0 0 0 0 0 0 0 0 0 0 0 0 0 0 0 0 0 1 0   0 1
          2            1 0 0 0 0 0 0 1 0 0 0 0 0 0 0 0 0 0 0   0 0

1 1  X X X X 0   0 0 0 0 0 0 0 0 0 0 0 0 0 0 0 0 1 1 0   1 0
          2            0 1 0 0 0 0 0 1 0 0 0 0 0 0 0 0 0 0 0   0 0

2 1  X X X X 0   0 0 1 0 0 0 0 0 0 0 0 0 0 0 0 0 0 0 0   1 1
          2            0 0 0 0 0 0 0 1 0 1 0 0 0 0 0 0 0 0 0   0 0

3 1  X X X X 0   0 0 0 1 1 0 1 0 0 0 0 0 0 0 0 0 0 0 0   0 0
```

|     |     |           |                              |     |
|-----|-----|-----------|------------------------------|-----|
|     | 2   |           | 1 0 0 0 0 0 0 1 0 0 0 1 0 0 0 0 0 0 | 0 0 |
| SAI | 0 1 | X X X X 0 | 0 0 0 0 0 0 0 0 0 0 0 0 0 0 0 0 1 0 | 0 1 |
|     | 2   |           | 1 0 0 0 0 0 0 1 0 0 0 0 0 0 0 0 0 0 | 0 0 |
|     | 1 1 | X X X X 0 | 0 0 0 0 0 0 0 0 0 0 0 0 0 0 0 1 1 0 | 1 0 |
|     | 2   |           | 0 1 0 0 0 0 0 1 0 0 0 0 0 0 0 0 0 0 | 0 0 |
|     | 2 1 | X X X X 0 | 0 0 1 0 0 0 0 0 0 0 0 0 0 0 0 0 0 0 | 1 1 |
|     | 2   |           | 0 0 0 0 0 0 0 0 1 0 1 0 0 0 0 0 0 0 | 0 0 |
|     | 3 1 | X X X X 0 | 0 0 0 1 1 0 1 0 0 0 0 0 0 0 0 0 0 0 | 0 0 |
|     | 2   |           | 1 0 0 0 0 0 0 1 0 0 0 1 0 0 0 0 0 0 | 0 0 |

APPENDIX 3
INSTRUCTION PLA (continued)

OUTPUT CONTROL SIGNALS

INPUTS / STATIC IMAGES

```
                           A A           I           A
                           B B A S C P N D A       A L           I
                           U U R H B C C B B A A A B U         I A
    I      S    P   C   R  S S 2 O U 2 2 2 U B 2 B U 2           A 2
    N      T    H   A   E  2 2 B R S C C A S U A U S A C S B B   N N
    S      A    A   R   S  A A B T 2 B B B 2 S B S 2 B L E I B S S S
    T      T S         R E  R R U B P U U U D 2 U 2 I U R T T U T V V
    R      E E   R R R F E  H L S C C S S S B A S B R S C C O S P 0 1
                  Y C E E T
                           2 2 1 1 1 1 1 2 2 3 3 3 3 2 3 2 2 1 1 2

XXXXX    XX    X X X X 1   1 0 0 1 1 0 0 1 0 0 0 0 1 0 1 0 0 0 0   0 0
00000    00    X X X X 0   1 0 0 1 1 0 1 1 0 0 0 0 1 0 1 0 0 0 1   0 0
00XXX    00    X X X X 0   1 0 0 1 1 0 1 1 0 0 0 0 1 1 1 1 0 0 0   0 0
01000    00    X X X X 0   1 0 0 1 1 0 1 1 0 0 0 0 1 0 1 0 0 0 0   0 0
01001    00    X X X X 0   1 0 0 1 1 0 1 1 0 0 0 0 1 0 0 1 0 0 0   0 0
01010    00    X X 1 X 0   1 0 0 1 1 0 1 1 0 0 0 0 1 0 0 0 0 0 0   0 0
01010    00    X X 0 X 0   1 0 0 1 0 1 0 1 0 0 0 0 1 0 0 0 0 0 0   0 0
01011    00    X X X 1 0   1 0 0 1 1 0 1 1 0 0 0 0 1 0 0 0 0 0 0   0 0
01011    00    X X X 0 0   1 0 0 1 0 1 0 1 0 0 0 0 1 0 0 0 0 0 0   0 0
01100    00    X 1 X X 0   1 0 0 1 1 0 1 1 0 0 0 0 1 0 0 0 0 0 0   0 0
01100    00    X 0 X X 0   1 0 0 1 0 1 0 1 0 0 0 0 1 0 0 0 0 0 0   0 0
01101    00    X X X X 0   0 0 0 1 1 0 1 1 0 1 0 0 0 0 0 0 0 0 0   0 1
01101    01    X X X X 0   1 0 0 1 1 0 1 1 0 0 0 1 0 0 0 0 0 0 0   0 0
01110    00    X X X X 0   1 0 0 1 1 0 1 1 0 0 0 1 1 0 0 0 0 0 0   0 0
1000X    00    X X X X 0   0 1 0 1 1 0 1 1 0 0 0 0 0 0 0 0 0 0 0   0 1
1000X    01    X X X X 0   0 0 1 0 0 0 0 1 0 1 0 0 0 0 0 0 0 0 0   1 0
1000X    10    X X X X 0   1 0 0 1 1 0 1 1 0 0 0 0 1 0 0 0 0 0 0   0 0
1001X    00    X X X X 0   0 1 0 1 1 0 1 1 0 0 0 0 0 0 0 0 0 0 0   0 1
1001X    01    X X X X 0   0 0 1 0 0 0 0 1 0 1 0 0 0 0 0 0 0 0 0   1 0
1001X    10    X X X X 0   1 0 0 1 1 0 1 1 0 0 0 0 1 0 0 0 0 0 0   0 0
1010X    00    X X X X 0   0 1 0 1 1 0 1 1 0 0 0 0 0 0 0 0 0 0 0   0 1
1010X    01    X X X X 0   1 0 1 1 1 0 0 1 0 0 0 0 1 0 0 0 0 0 0   0 0
1011X    00    X X X X 0   0 1 0 1 1 0 1 1 0 0 0 0 0 0 0 0 0 0 0   0 1
1011X    01    1 X X X 0   1 0 1 1 1 0 0 1 0 0 0 1 0 0 0 0 0 0 0   0 0
1011X    01    0 X X X 0   1 0 0 1 1 0 1 1 0 0 0 1 0 0 0 0 0 0 0   0 0
1100X    00    X X X X 0   0 1 0 1 1 0 1 1 0 0 0 0 0 0 0 0 0 0 0   0 1
1100X    01    0 X X X 0   1 0 1 1 1 0 0 1 0 0 0 1 0 0 0 0 0 0 0   0 0
1100X    01    1 X X X 0   1 0 0 1 1 0 1 1 0 0 0 1 0 0 0 0 0 0 0   0 0
1101X    00    X X X X 0   1 0 0 0 0 0 1 0 0 0 0 0 0 0 0 0 0 1 0   0 1
1101X    01    X X X X 0   0 1 0 0 0 0 1 0 0 0 0 0 0 0 0 1 1 0   1 0
1101X    10    X X X X 0   0 0 1 0 0 0 0 1 0 1 0 0 0 0 0 0 0 0 0   1 1
1101X    11    X X X X 0   1 0 0 1 1 0 1 1 0 0 0 1 0 0 0 0 0 0 0   0 0
1110X    00    X X X X 0   1 0 0 0 0 0 1 0 0 0 0 0 0 0 0 0 0 1 0   0 1
1110X    01    X X X X 0   0 1 0 0 0 0 1 0 0 0 0 0 0 0 0 1 1 0   1 0
1110X    10    X X X X 0   0 0 1 0 0 0 0 1 0 1 0 0 0 0 0 0 0 0 0   1 1
1110X    11    X X X X 0   1 0 0 1 1 0 1 1 0 0 0 1 0 0 0 0 0 0 0   0 0
```

TI-19360 P1

What is claimed is:

1. A method for configuring a single integrated circuit as a transmitter and as a receiver, comprising the steps of:

configuring the single integrated circuit as a receiver receiving an identification code;

configuring the single integrated circuit as a transmitter, and using the identification code;

transmitting a signal from the transmitter.

2. This method of claim 1, wherein;

said method further includes the step of switching said single integrated circuit between said transmitter and said receiver being performed with a microprocessor.

* * * * *